US012516624B2

(12) United States Patent
Hasegawa et al.

(10) Patent No.: US 12,516,624 B2
(45) Date of Patent: Jan. 6, 2026

(54) OUTBOARD MOTOR AND VESSEL (71) Applicant: YAMAHA HATSUDOKI KABUSHIKI KAISHA, Iwata (JP)

(72) Inventors: Hiroyuki Hasegawa, Shizuoka (JP); Toru Takahashi, Shizuoka (JP); Kazuhiro Hara, Shizuoka (JP); Takeshi Sukeshita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 183 days.

(21) Appl. No.: 18/220,902

(22) Filed: Jul. 12, 2023

(65) Prior Publication Data

US 2024/0141829 A1 May 2, 2024

(30) Foreign Application Priority Data

Oct. 28, 2022 (JP) ................. 2022-173268

(51) Int. Cl.
B63H 20/32 (2006.01)
F02B 77/13 (2006.01)
F02M 35/12 (2006.01)
F02M 35/16 (2006.01)

(52) U.S. Cl.
CPC ............. F02B 77/13 (2013.01); B63H 20/32 (2013.01); F02M 35/1272 (2013.01); F02M 35/167 (2013.01)

(58) Field of Classification Search
CPC ......... B63H 20/32; F02B 77/13; F02M 35/12; F02M 35/1238; F02M 35/1272; F02M 35/1277; F02M 35/167

USPC .... 123/195 C, 195 HC, 195 P, 196 W, 198 E
See application file for complete search history.

(56) References Cited

U.S. PATENT DOCUMENTS

| | | | | |
|---|---|---|---|---|
| 3,195,530 A * | 7/1965 | Heidner | ............ | F02M 35/1272 181/204 |
| 4,348,194 A * | 9/1982 | Walsh | ...................... | F02B 77/13 123/195 P |
| 4,978,321 A * | 12/1990 | Ferguson | .............. | F02B 61/045 123/195 C |
| 6,358,106 B1 * | 3/2002 | Herrera | ................... | F02B 77/13 181/204 |
| 6,875,066 B2 * | 4/2005 | Wolaver | .................. | F02B 77/13 181/204 |
| 7,485,019 B1 | 2/2009 | Macier et al. | | |
| 10,843,780 B2 * | 11/2020 | Willard | .................. | B63H 20/32 |
| 2005/0051384 A1 * | 3/2005 | Breznik | ............. | F02M 35/1277 181/269 |
| 2019/0283853 A1 * | 9/2019 | Willard | .................. | B63B 17/02 |

* cited by examiner

Primary Examiner — Erick R Solis
(74) Attorney, Agent, or Firm — Keating & Bennett, LLP (57) ABSTRACT An outboard motor includes an engine assembly, a top cowl assembly, and a soundproof material. The engine assembly includes an engine main body and an intake port to take outside air into the engine main body. The top cowl assembly includes a top cowl to house at least a portion of the engine assembly and a cover to cover at least a portion of an outside of the top cowl. The soundproof material is provided between the top cowl and the cover at a location opposed to the intake port in the top cowl assembly.

20 Claims, 12 Drawing Sheets

OUTBOARD MOTOR AND VESSEL

CROSS-REFERENCE TO RELATED APPLICATIONS

The present application claims priority to Japanese Patent Application No. 2022-173268, filed on Oct. 28, 2022. The contents of this application are incorporated herein by reference in their entirety.

BACKGROUND OF THE INVENTION

1. Field of the Invention

The technology disclosed herein relates to an outboard motor and a vessel.

2. Description of the Related Art

A vessel includes a hull and an outboard motor attached to a rear portion of the hull. The outboard motor generates a thrust force to propel the vessel.

The outboard motor includes an engine assembly and a cowl housing the engine assembly. The engine assembly includes an engine main body and an intake port that takes outside air into the engine main body.

An operation of the engine assembly causes noise. One of the main factors of the noise caused by the engine assembly is intake noise that occurs near the intake port. Intake noise may resonate inside the outboard motor so that occupants are subjected to even more noise. There is a conventionally discussed configuration of an outboard motor in which a silencer is provided between an engine and a cover of the engine (see U.S. Pat. No. 7,485,019 B, for example).

In an outboard motor, the volume of space between the engine assembly and the cowl affects the amount of air taken in by the engine assembly. Therefore, when a silencer is provided between the engine assembly and the cowl, the volume inside the cowl is reduced, which may reduce the amount of air taken in by the engine assembly and furthermore reduce the output of the engine main body.

SUMMARY OF THE INVENTION

Preferred embodiments of the present invention provide solutions to the issue described above.

Preferred embodiments of the present invention may be implemented, for example, in the following aspects.

An outboard motor according to a preferred embodiment of the present invention includes an engine assembly, a top cowl assembly, and a soundproof material. The engine assembly includes an engine main body and an intake port to take outside air into the engine main body. The top cowl assembly includes a top cowl to house at least a portion of the engine assembly and a cover to cover at least a portion of an outside of the top cowl. The soundproof material is provided between the top cowl and the cover at a location opposed to the intake port in the top cowl assembly.

In the outboard motor, the soundproof material may be provided at a location relatively close to the intake port of the engine assembly without reducing the volume of space between the engine assembly and the top cowl assembly, which is a space related to the intake of air into the engine assembly in the outboard motor. Therefore, the intake noise of the engine assembly heard by occupants of a vessel including the outboard motor may be effectively suppressed without reducing the output of the engine main body.

An outboard motor according to another preferred embodiment of the present invention includes an engine assembly, a cowl assembly, and a soundproof material. The cowl assembly includes a plurality of cowls and houses at least a portion of the engine assembly, and the plurality of cowls include at least one overlapping area where the plurality of cowls overlap with each other inside and outside the cowl assembly. The soundproof material is provided in the at least one overlapping area.

In the outboard motor, the soundproof material may be provided without reducing the volume of space between the engine assembly and the cowl assembly, which is a space related to the intake of air into the engine assembly in the outboard motor. Therefore, the noise due to the engine assembly heard by occupants of a vessel including the outboard motor may be suppressed without reducing the output of the engine main body.

The preferred embodiments of the present invention disclosed in this description may be implemented in various aspects, for example, as an outboard motor, or a vessel including an outboard motor and a hull.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
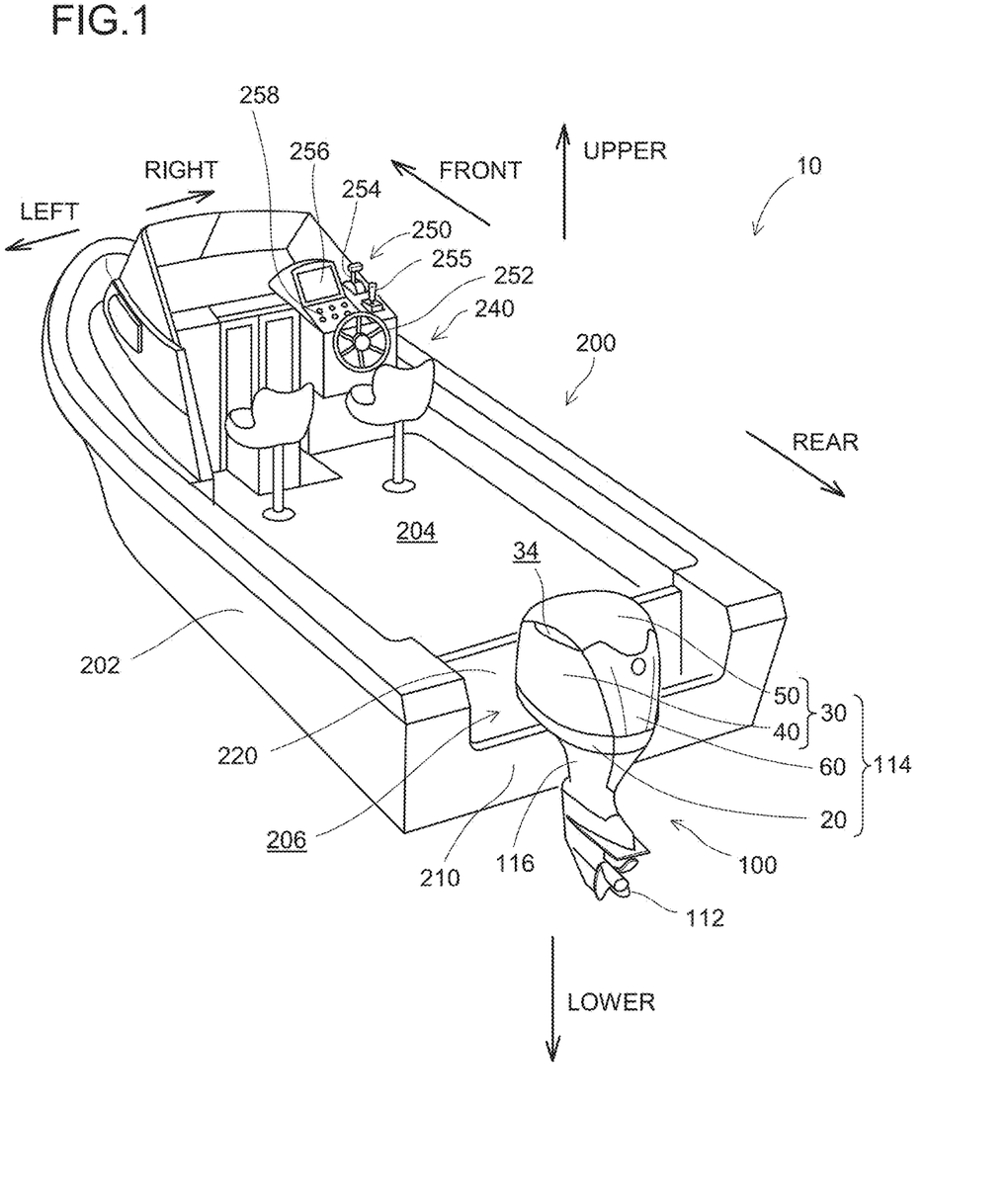
FIG. 1 is a perspective view schematically illustrating a configuration of a vessel according to a first preferred embodiment of the present invention.

FIG. 1 is a perspective view schematically illustrating a configuration of a vessel 10 according to a first preferred embodiment of the present invention. FIG. 1 and the other figures described below illustrate the arrow indicating each direction with respect to the position of the vessel 10. More specifically, each figure illustrates the arrows indicating a front side (FRONT), a rear side (REAR), a left side (LEFT), a right side (RIGHT), an upper side (UPPER), and a lower side (LOWER). The front-rear direction, the right-left direction, and the up-down direction (vertical direction) are perpendicular to each other.

The vessel 10 includes a hull 200 and an outboard motor 100. According to the present preferred embodiment, although the vessel 10 includes one outboard motor 100, it may include a plurality of outboard motors 100.

The hull 200 is a portion of the vessel 10 which a passenger gets on board. The hull 200 includes a hull main body portion 202 including a living space 204, a cockpit 240 provided in the living space 204, and an operating device 250 provided near the cockpit 240. The operating device 250 maneuvers the vessel and includes, for example, a steering wheel 252, a shift/throttle lever 254, a joystick 255, a monitor 256, and an input device 258. The hull 200 further includes a partition wall 220 that defines a rear end of the living space 204 and a transom 210 located at the rear end of the hull 200. In the front-rear direction, a space 206 is provided between the transom 210 and the partition wall 220.

Figure 2:
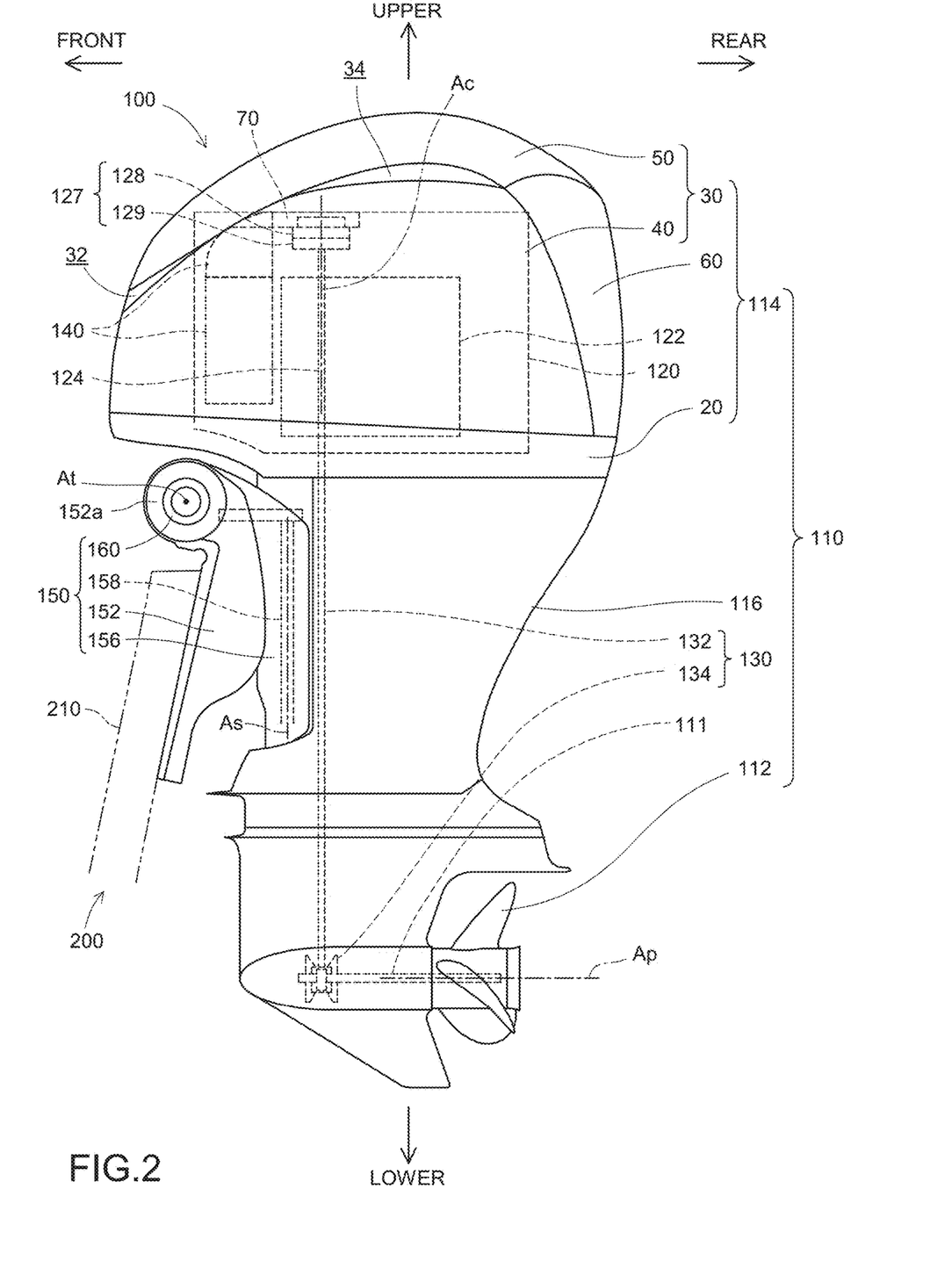
FIG. 2 is a side view schematically illustrating a configuration of an outboard motor according to the first preferred embodiment of the present invention.

FIG. 2 is a side view schematically illustrating a configuration of the outboard motor 100 according to the first preferred embodiment. The outboard motor 100 in a reference posture is described below unless otherwise noted. The reference posture is such a posture in which a rotation axis Ac of a crankshaft 124 described below extends in the up-down direction and a rotation axis Ap of a propeller shaft 111 described below extends in the front-rear direction. The front-rear direction, the right-left direction, and the up-down direction are defined based on the outboard motor 100 in the reference posture.

The outboard motor 100 generates a thrust force to propel the vessel 10. The outboard motor 100 is attached to the transom 210 in the rear portion of the hull 200. The outboard motor 100 includes an outboard motor main body 110 and a suspension device 150.

The outboard motor main body 110 includes an engine assembly 120, the propeller shaft 111, a propeller 112, a transmission mechanism 130, a cowl assembly 114, and a casing 116.

Figure 3:
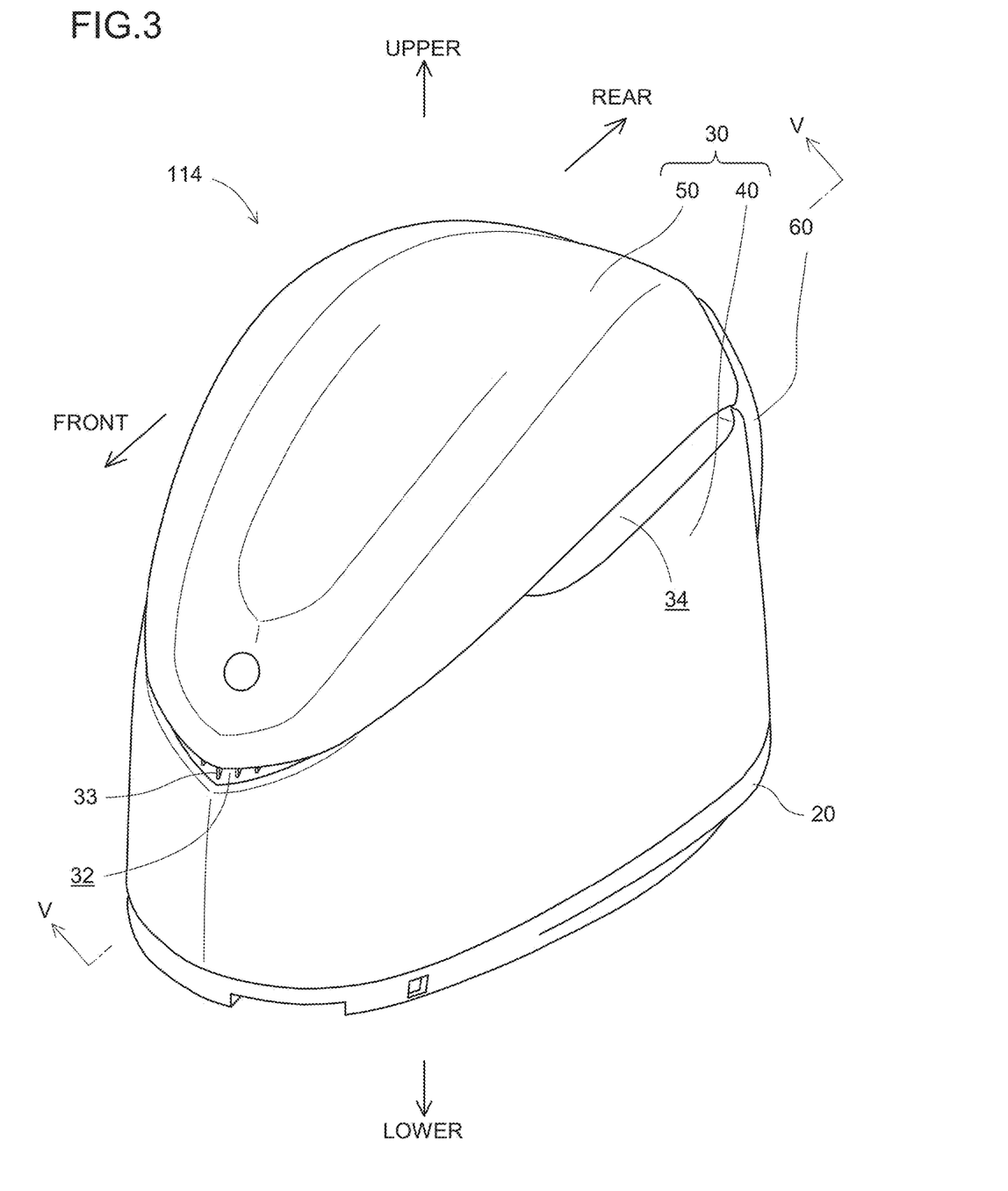
FIG. 3 is an explanatory diagram illustrating an external configuration of a cowl assembly.

FIG. 3 is an explanatory diagram illustrating an external configuration of the cowl assembly 114. The cowl assembly 114 is a housing located in an upper portion of the outboard motor main body 110. The cowl assembly 114 includes a bottom cowl 20 defining a lower portion of the cowl assembly 114, a top cowl assembly 30 defining an upper portion of the cowl assembly 114, and a rear panel 60 defining a rear portion of the cowl assembly 114. The top cowl assembly 30 includes a top cowl 40 defining a lower portion of the top cowl assembly 30 and a cover 50 to cover at least a portion of the top cowl 40 from the outside. The top cowl assembly 30 and the rear panel 60 are removably attached to the bottom cowl 20.

The top cowl assembly 30 includes a cowl intake port 34 and a heat exhaust port 32. The cowl intake port 34 is an opening to take outside air into the inside of the cowl assembly 114. The outside air taken through the cowl intake port 34 is supplied to the engine assembly 120. The heat exhaust port 32 is an opening through which heat is discharged from the inside of the cowl assembly 114. A louver 33 is provided in the heat exhaust port 32.

The casing 116 is a housing located below the cowl assembly 114 and in a lower portion of the outboard motor main body 110.

The engine assembly 120 is housed in the top cowl 40. The engine assembly 120 includes an engine main body 122, a flywheel magnet generator 127, a heat exhaust-related component 70, and an intake-related component 140.

The engine main body 122 generates power. The engine main body 122 includes, for example, an internal combustion engine. The engine main body 122 includes the crankshaft 124 that converts a reciprocating motion of a piston (not illustrated) into a rotational motion. The crankshaft 124 is provided in such a posture that the rotation axis Ac extends in the up-down direction.

The flywheel magnet generator 127 is an alternating-current generator serving as an auxiliary device for the engine main body 122 and is housed above the engine main body 122 in the top cowl 40. The flywheel magnet generator 127 includes a flywheel rotor 128 and a stator 129. The flywheel rotor 128 is coupled to an upper end portion of the crankshaft 124 to rotate along with the rotation of the crankshaft 124.

The heat exhaust-related component 70 discharges heat around the engine main body 122. The intake-related component 140 intakes outside air into the engine main body 122. The configurations of the heat exhaust-related component 70 and the intake-related component 140 will be described in detail below.

The propeller shaft 111 is a rod-shaped member and is located in a relatively lower position in the outboard motor main body 110 in a posture extending in the front-rear direction. A front end portion of the propeller shaft 111 is housed in the casing 116, and a rear end portion of the propeller shaft 111 protrudes to the rear side from the casing 116.

The propeller 112 is a rotor including a plurality of blades and is attached to a rear end portion of the propeller shaft 111. The propeller 112 rotates along with the rotation of the propeller shaft 111 around the rotation axis Ap. The propeller 112 rotates to generate a thrust force.

The transmission mechanism 130 transmits the rotation of the engine main body 122 to the propeller shaft 111. At least a portion of the transmission mechanism 130 is housed in the casing 116. The transmission mechanism 130 includes a drive shaft 132 and a shift mechanism 134.

The drive shaft 132 is a rod-shaped member and is located below the crankshaft 124 of the engine main body 122 in a posture extending in the up-down direction. An upper end portion of the drive shaft 132 is coupled to the crankshaft 124. The drive shaft 132 rotates along with the rotation of the engine main body 122 (the crankshaft 124).

The shift mechanism 134 is coupled to a lower end portion of the drive shaft 132 and is coupled to a front end portion of the propeller shaft 111. The shift mechanism 134 includes, for example, a plurality of gears and a clutch that switches the engagement of the gears, and transmits the rotation of the drive shaft 132 caused by the rotation of the engine main body 122 to the propeller shaft 111 in such a manner that the rotation direction may be switched. When the shift mechanism 134 transmits the rotation of the drive shaft 132 as the rotation in a forward direction to the propeller shaft 111, the propeller 112 rotating in the forward direction together with the propeller shaft 111 generates a thrust force in the forward direction. Conversely, when the shift mechanism 134 transmits the rotation of the drive shaft 132 as the rotation in a reverse direction to the propeller shaft 111, the propeller 112 rotating in the reverse direction together with the propeller shaft 111 generates a thrust force in the backward direction.

The suspension device 150 suspends the outboard motor main body 110 on the hull 200. The suspension device 150 includes a pair of right and left clamp brackets 152, a tilt shaft 160, a swivel bracket 156, and a steering shaft 158.

The pair of right and left clamp brackets 152 are located in the rear portion of the hull 200 with a space between each other in the right-left direction and are secured to the transom 210 of the hull 200 with bolts, for example. Each of the clamp brackets 152 includes a cylindrical support portion 152a provided with a through-hole extending in the right-left direction.

The tilt shaft 160 is a rod-shaped member and is rotatably supported in the through-hole in the support portion 152a of the clamp bracket 152. A tilt axis At, which is the center line of the tilt shaft 160, defines an axis in a horizontal direction (right-left direction) during a tilt operation of the outboard motor 100. The swivel bracket 156 is located between the pair of clamp brackets 152 and is supported by the support portion 152a of the clamp bracket 152 via the tilt shaft 160 so as to be rotatable around the tilt axis At. The swivel bracket 156 is driven by a tilt device (not illustrated) including an actuator such as a hydraulic cylinder to rotate around the tilt axis At with respect to the clamp bracket 152.

The steering shaft 158 is a rod-shaped member and is supported by the swivel bracket 156 in a posture extending in the up-down direction so as to be rotatable around the steering axis As, which is the center line of the steering shaft 158. The steering shaft 158 is driven by a steering device (not illustrated) including an actuator such as a hydraulic cylinder to rotate around the steering axis As with respect to the swivel bracket 156.

The outboard motor main body 110 is secured to the steering shaft 158. Therefore, when the steering shaft 158 rotates around the steering axis As with respect to the swivel bracket 156, the outboard motor main body 110 secured to the steering shaft 158 also rotates around the steering axis As. Accordingly, the direction of the thrust force generated by the propeller 112 with respect to the direction of the hull 200 is changed, and thus the steering of the vessel 10 is achieved.

When the swivel bracket 156 rotates around the tilt axis At with respect to the clamp bracket 152, the steering shaft 158 supported by the swivel bracket 156 and the outboard motor main body 110 secured to the steering shaft 158 also rotate around the tilt axis At. This enables a tilt operation to rotate the outboard motor main body 110 in the up-down direction with respect to the hull 200. The tilt operation of the outboard motor 100 may change the angle of the outboard motor main body 110 around the tilt axis At in the range from a tilt-down state where the propeller 112 is in the water (the state where the outboard motor 100 is in the reference posture) to a tilt-up state where the propeller 112 is located above the water surface. A trim operation may also be performed to adjust the angle of the outboard motor main body 110 around the tilt axis At and thus adjust the posture of the vessel 10 during traveling.

Figure 4:
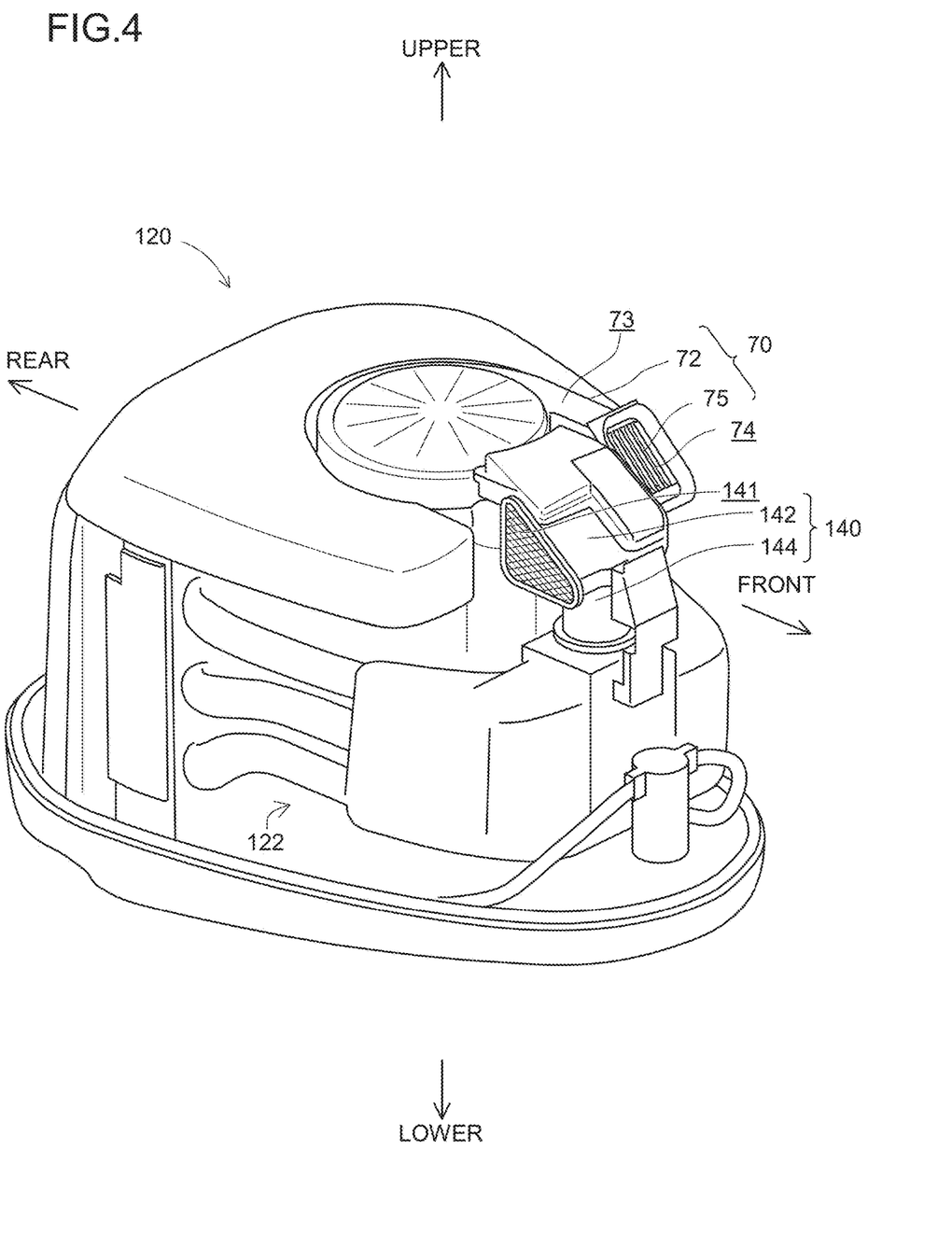
FIG. 4 is an explanatory diagram schematically illustrating a configuration of an engine assembly.

FIG. 4 is an explanatory diagram schematically illustrating a configuration of the engine assembly 120. The engine assembly 120 includes the engine main body 122, the intake-related component 140, and the heat exhaust-related component 70.

The intake-related component 140 includes a silencer case 142 and a throttle body 144. The silencer case 142 is provided with an intake port 141. The intake port 141 is an opening to take outside air into the engine main body 122. The intake port 141 is exposed upward in the engine assembly 120 and is exposed frontward in the engine assembly 120. The term "the intake port 141 exposed upward (frontward)" indicates not only a mode in which the intake port 141 faces upward (frontward) but also a mode in which there are substantially no other components included in the engine assembly 120 above (in front of) the intake port 141.

The throttle body 144 controls the amount of air supplied to the engine main body 122. The throttle body 144 is coupled to the silencer case 142. The outside air taken in by the intake port 141 is supplied to the engine main body 122 after flowing into an air channel (not illustrated) in the throttle body 144.

The heat exhaust-related component 70 discharges the heat around the engine main body 122. The heat exhaust-related component 70 includes a shroud cover 72, a fan (not illustrated) covered by the shroud cover 72, and a louver 75. The louver 75 defines a discharge port 74, which is an outlet for exhaust heat. The shroud cover 72 defines a heat exhaust channel 73 that communicates with the discharge port 74. The heat generated by the operation of the engine main body 122 is discharged from the engine main body 122 by the operation of the fan (not illustrated) and passes through the heat exhaust channel 73 and the discharge port 74 to be discharged from the engine assembly 120.

Figure 5:
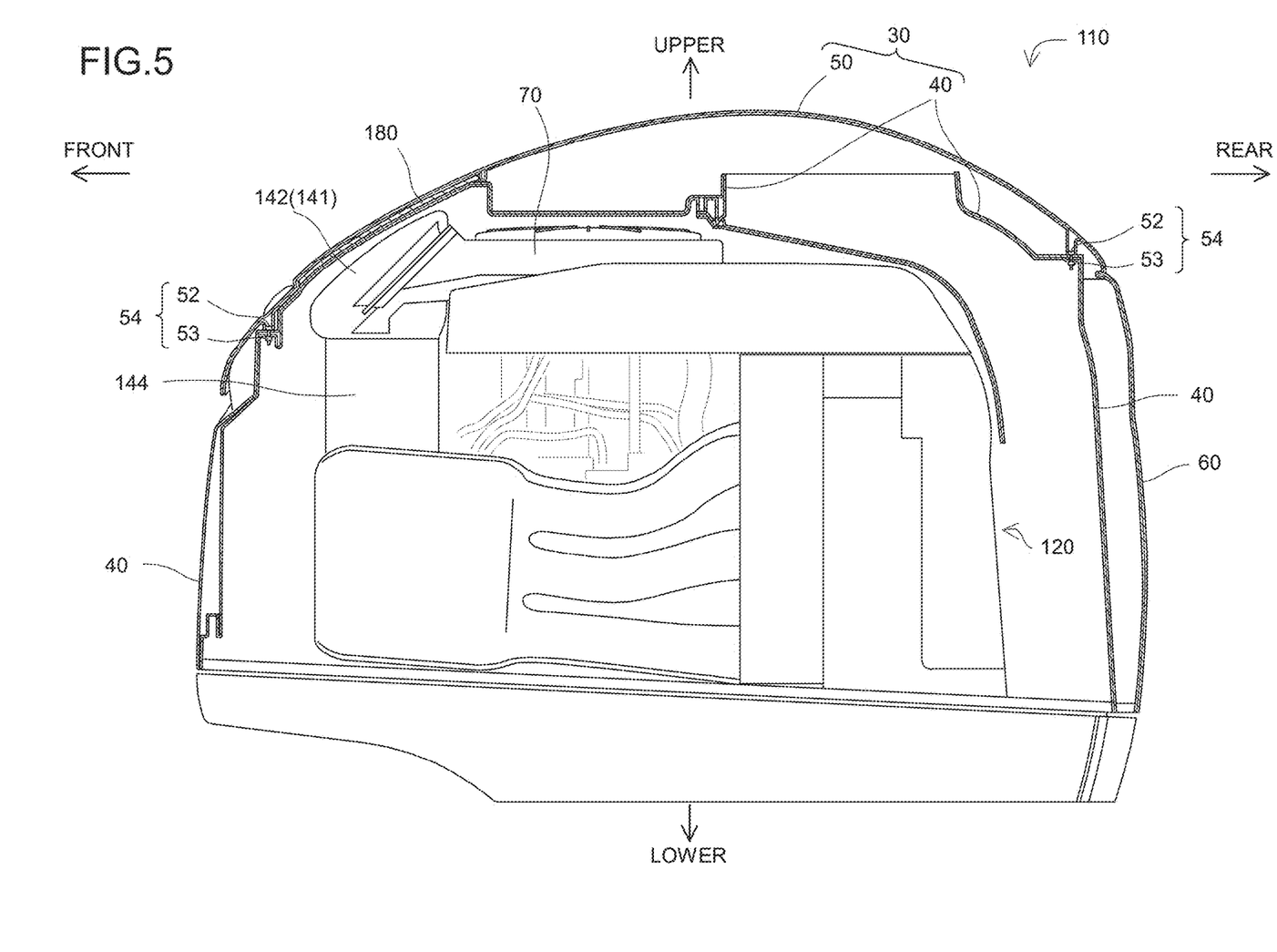
FIG. 5 is an explanatory diagram illustrating a cross-sectional configuration of an outboard motor main body along V-V in FIG. 3.
Figure 6:
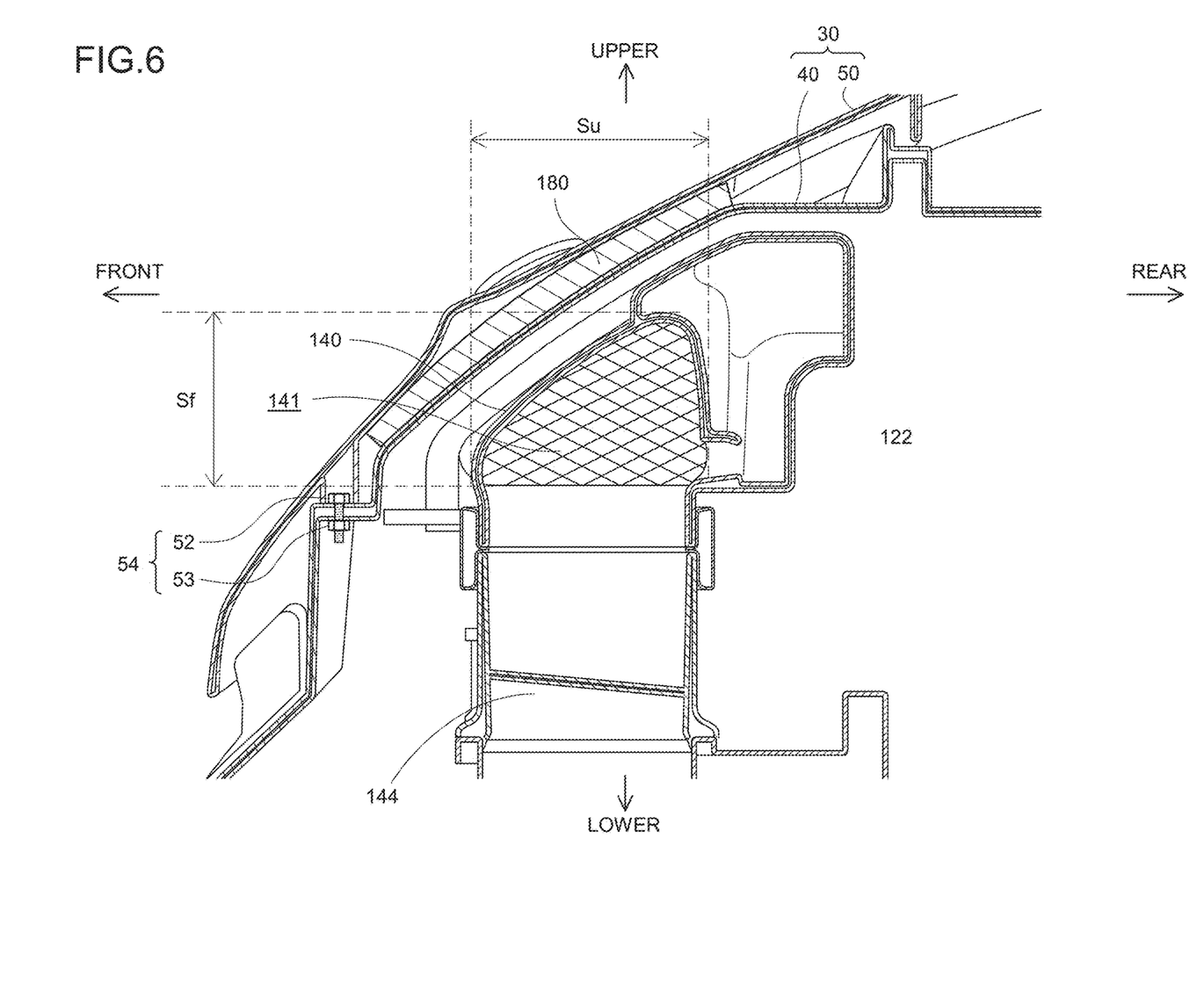
FIG. 6 is an explanatory diagram illustrating a detailed configuration of an area around an intake port in FIG. 5.

FIG. 5 is an explanatory diagram illustrating a cross-sectional configuration of the outboard motor main body 110 along V-V in FIG. 3. FIG. 5 illustrates the cross-sectional configuration of the outboard motor main body 110 at the center in the right-left direction. For convenience, FIG. 5 illustrates the side configuration instead of the cross-sectional configuration for the engine assembly 120. FIG. 6 is an explanatory diagram illustrating a detailed configuration of an area around the intake port 141 in FIG. 5. For convenience, FIG. 6 does not illustrate some configurations of the engine assembly 120.

As illustrated in FIG. 5, a soundproof material 180 is provided between the top cowl 40 and the cover 50 at a location opposed to the intake port 141 in the top cowl assembly 30. The "portion opposed to the intake port 141 in the top cowl assembly 30" refers to a portion of the top cowl assembly 30 located in the same direction as the intake port 141 with respect to the center of a virtual cuboid inscribed by the outer periphery line of the engine assembly 120 (hereinafter simply referred to as the "center of the engine assembly 120"). According to the present preferred embodiment, the intake port 141 is exposed upward and frontward in the engine assembly 120, and therefore the intake port 141 is located upward and frontward with respect to the center of the engine assembly 120. Therefore, as illustrated in FIG. 6, according to the present preferred embodiment, the portion opposed to the intake port 141 in the top cowl assembly 30 corresponds to a portion included at a location (hereinafter, also referred to as "immediately above portion") Su immediately above the intake port 141 in the top cowl assembly 30 and a portion (hereinafter, also referred to as "immediately front portion") Sf immediately in front of the intake port 141 in the top cowl assembly 30. The soundproof material 180 is provided at a location including the immediately above portion Su and the immediately front portion Sf.

The soundproof material 180 is a sound absorbing material made of a porous material, for example, to suppress noise. The soundproof material 180 is sandwiched between the top cowl 40 and the cover 50. As illustrated in FIG. 5, the top cowl 40 and the cover 50 are secured to each other with a fastener 54 including a bolt 52 and a nut 53 that is engaged with the bolt 52. The fastener 54 also secures the soundproof material 180 sandwiched between the top cowl 40 and the cover 50 in the same manner.

Figure 7:
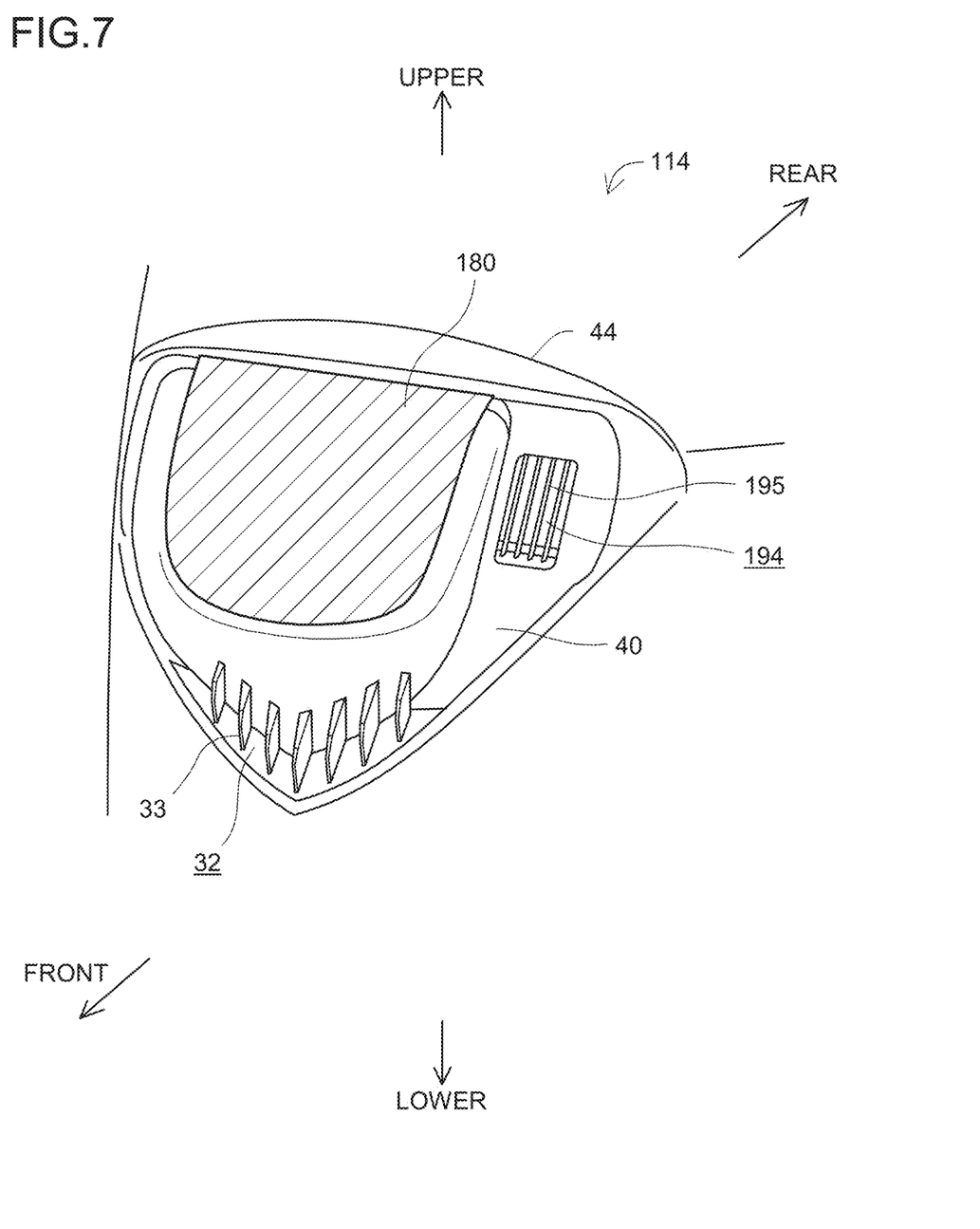
FIG. 7 is an explanatory diagram illustrating details of an installation position of a soundproof material.

FIG. 7 is an explanatory diagram illustrating details of an installation position of the soundproof material 180. For convenience, FIG. 7 does not illustrate the cover 50 that covers the top cowl 40 and the soundproof material 180 from the outside. The heat in the engine assembly 120 passes through a discharge port 194 and then through the heat exhaust port 32 to be discharged to the outside of the cowl assembly 114. As illustrated in FIG. 7, the soundproof material 180 is provided at a location that does not block the heat exhaust port 32. The cowl intake port 34, which takes outside air into the inside of the cowl assembly 114, is provided on a rear side with respect to a rib 44 in the top cowl 40. Specifically, the soundproof material 180 is provided at a location that does not block the cowl intake port 34.

Figure 8A:
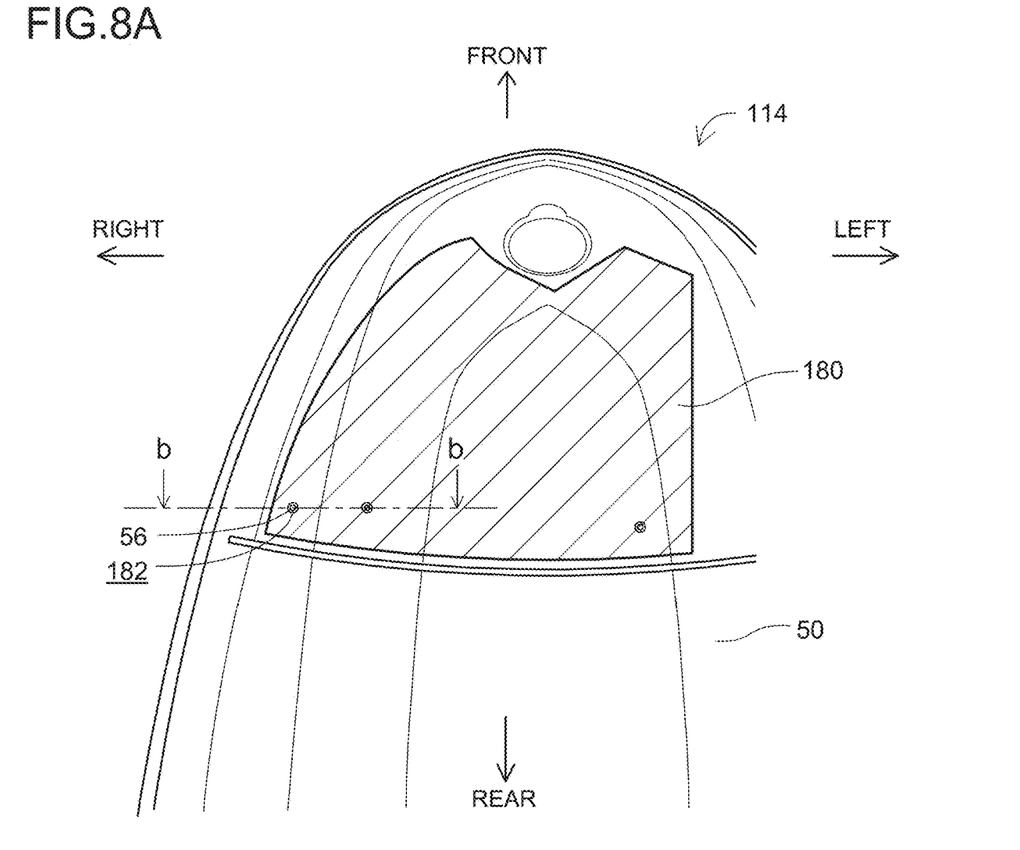
FIGS. 8A and 8B are explanatory diagrams illustrating a detailed configuration of the soundproof material.
Figure 8B:
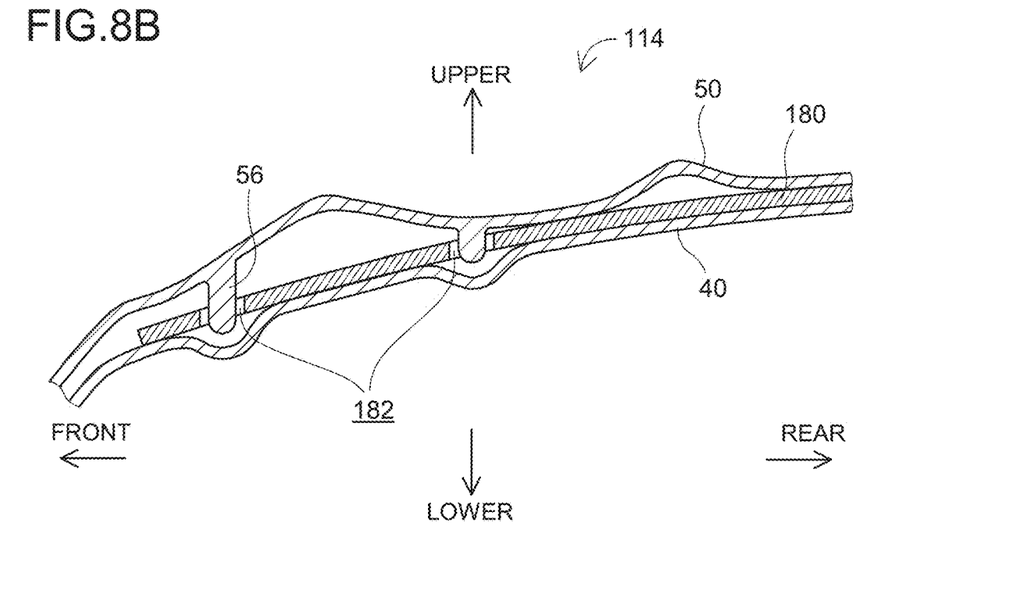

FIGS. 8A and 8B are explanatory diagrams illustrating a detailed configuration of the soundproof material 180. FIG. 8A is an explanatory diagram illustrating the arrangement of the soundproof material 180 and the cover 50 when viewed from inside the cowl assembly 114. FIG. 8B is an explanatory diagram illustrating the arrangement of the soundproof material 180, the top cowl 40, and the cover 50 at a location along b-b in FIG. 8A.

As illustrated in FIGS. 8A and 8B, the cover 50 is provided with a protrusion 56 protruding toward the inside of the cowl assembly 114. The soundproof material 180 is substantially sheet-shaped and includes a hole 182 therein, which has a size through which the protrusion 56 penetrates. As illustrated in FIGS. 8A and 8B, the soundproof material 180 is fastened by the engagement between the protrusion 56 in the cover 50 and the hole 182 in the soundproof material 180.

Next, the performance evaluation of the outboard motor 100 will be described. The sound pressure levels were measured individually for the outboard motor 100 with the soundproof material 180 and the outboard motor 100 without the soundproof material 180 (which has the same configuration as that of the outboard motor 100 except that the soundproof material 180 is not provided).

A precision microphone and a recorder were placed in a semi-anechoic chamber, an outboard motor, which was the measurement target, was operated, and thus sound pressure levels were measured. The precision microphone and the measurement target were located such that the distance between the precision microphone and the measurement target is approximately equal to the distance between the cockpit 240 and the outboard motor 100 in the vessel 10. That is, the sound pressure level measured in this performance evaluation is assumed to be the noise received by an occupant on the vessel.

Figure 9:
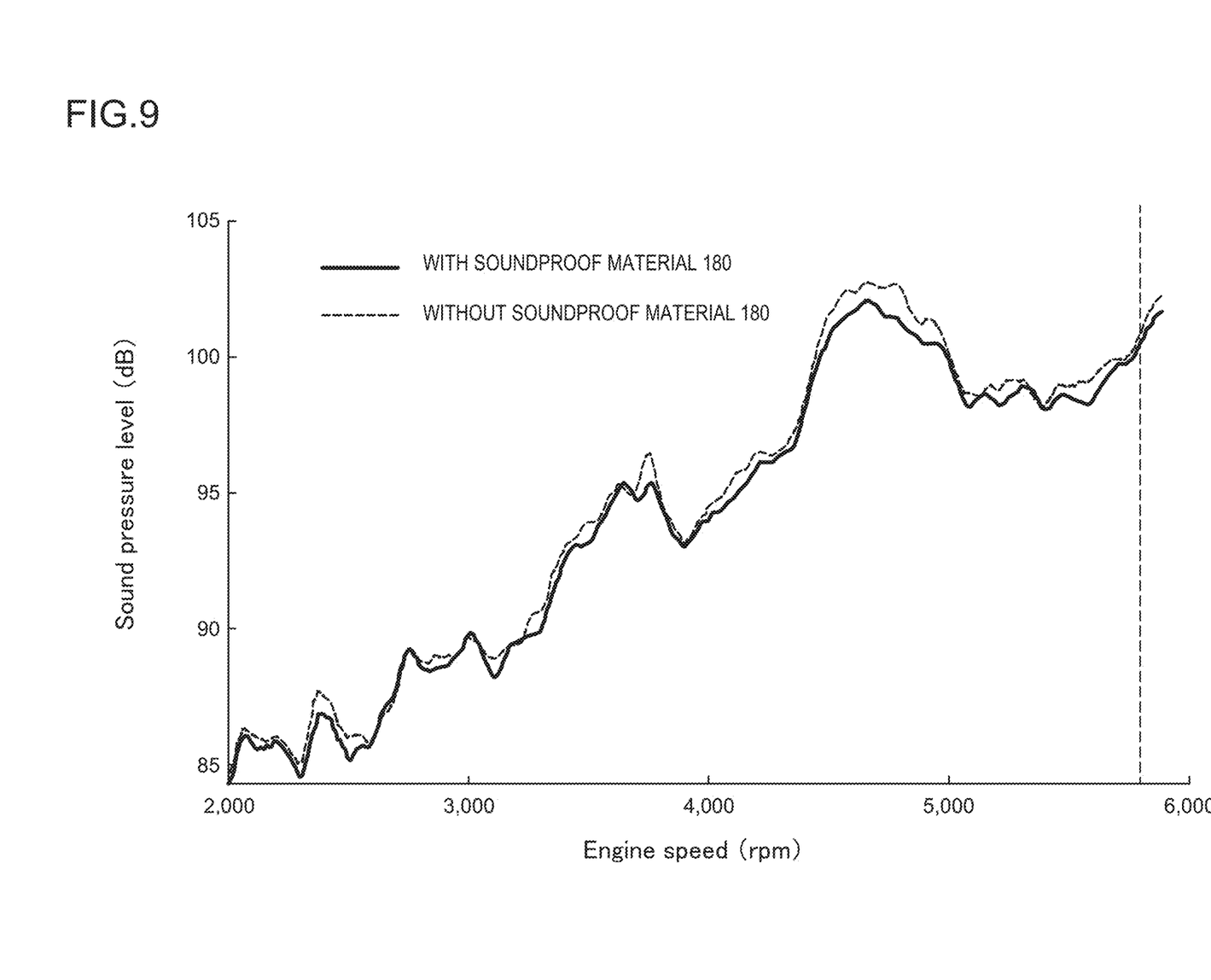
FIG. 9 is an explanatory diagram illustrating the correlation between an engine speed and a sound pressure level in the outboard motor with and without the soundproof material.

FIG. 9 is an explanatory diagram illustrating the correlation between the engine speed and the sound pressure level in the outboard motor 100 with and without the soundproof material 180. The vertical axis in FIG. 9 indicates the sound pressure level (dB), and the horizontal axis in FIG. 9 indicates the engine speed (rpm) of the outboard motor. In FIG. 9, the sound pressure level of the outboard motor 100 with the soundproof material 180 is indicated in a solid line ("with the soundproof material 180" in the figure) and the sound pressure level of the outboard motor 100 without the soundproof material 180 is indicated in a dotted line ("without the soundproof material 180" in the figure). In FIG. 9, the dotted line parallel to the vertical axis indicates the engine speed (5,800 rpm) at full throttle.

As illustrated in FIG. 9, according to the comparison at full throttle, the sound pressure level of the outboard motor 100 with the soundproof material 180 indicates a lower level than that of the outboard motor 100 without the soundproof material 180, and the difference is 0.4 dB. The sound pressure level of the outboard motor 100 with the soundproof material 180 tends to be lower than that of the outboard motor 100 without the soundproof material 180 not only at full throttle. According to the above evaluation result, it is confirmed that the installation of the soundproof material 180 in the outboard motor 100 reduces the sound pressure level perceived by the occupant on board the vessel.

Figure 10:
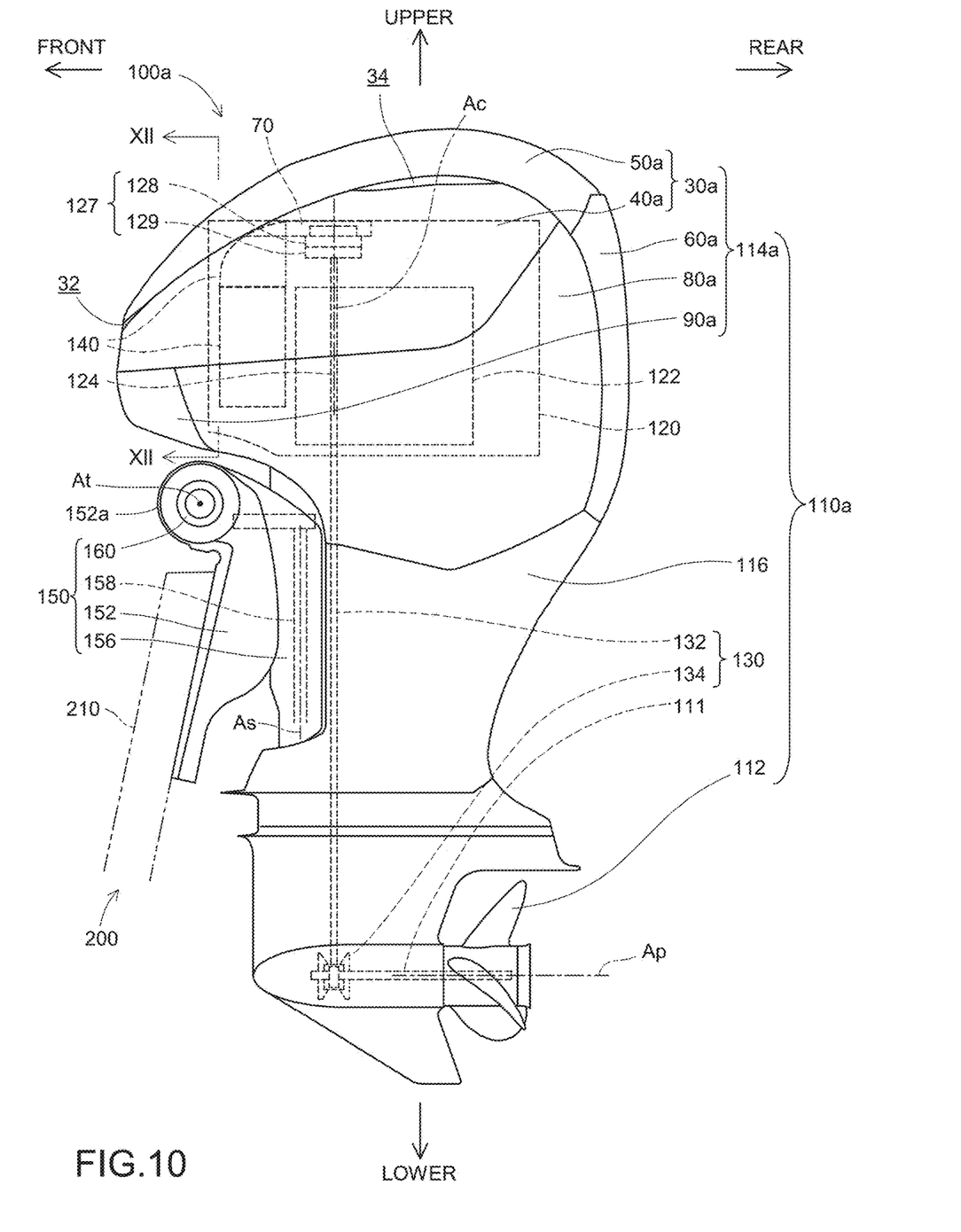
FIG. 10 is a side view schematically illustrating a configuration of an outboard motor according to a second preferred embodiment of the present invention.

FIG. 10 is a side view schematically illustrating a configuration of an outboard motor 100a according to a second preferred embodiment of the present invention. In the following, among the configurations of the outboard motor 100a according to the second preferred embodiment, the same configurations as those of the outboard motor 100 according to the first preferred embodiment above will be denoted by the same reference numerals, and their descriptions will be omitted as appropriate.

In the outboard motor 100a according to the second preferred embodiment, the configuration of a cowl assembly 114a in an outboard motor main body 110a is different from that of the outboard motor 100 according to the first preferred embodiment. Specifically, the cowl assembly 114a according to the second preferred embodiment includes a top cowl assembly 30a defining an upper portion of the cowl assembly 114a, a rear panel 60a defining a rear portion of the cowl assembly 114a, a side bottom cowl 80a defining right and left lower portions of the cowl assembly 114a, and a front bottom cowl 90a defining a front lower portion of the cowl assembly 114a. The top cowl assembly 30a includes a top cowl 40a defining a lower portion of the top cowl assembly 30a and a cover 50a to cover at least a portion of the top cowl 40a from the outside. The top cowl 40a, the cover 50a, the rear panel 60a, the side bottom cowl 80a, and the front bottom cowl 90a are examples of a cowl.

Figure 11:
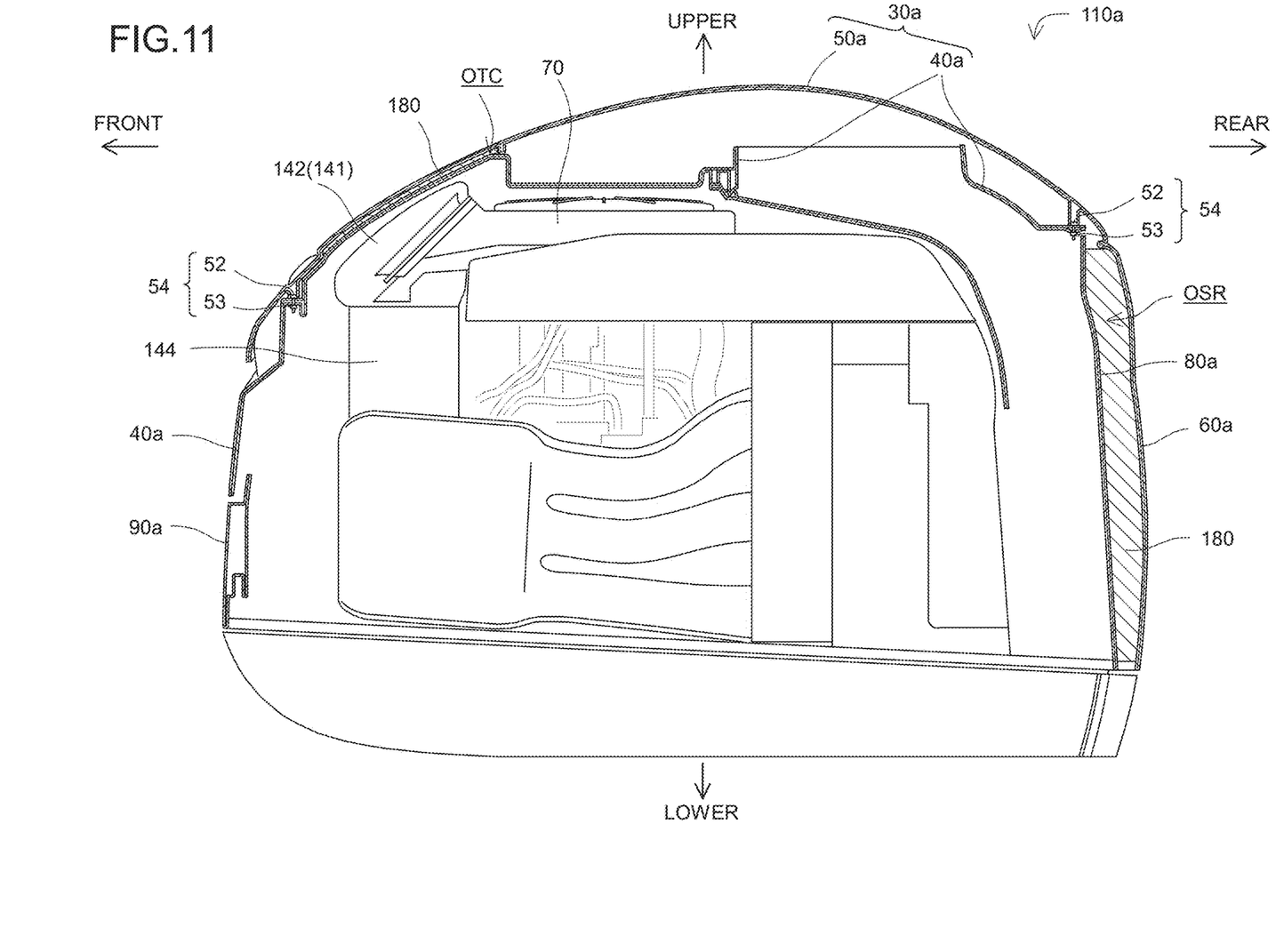
FIG. 11 is an explanatory diagram illustrating a cross-sectional configuration of an outboard motor main body in the same position as that in FIG. 5.

FIG. 11 is an explanatory diagram illustrating a cross-sectional configuration of the outboard motor main body 110a in the same position as that in FIG. 5. As illustrated in FIG. 11, the top cowl 40a and the cover 50a include an overlapping area OTC where the top cowl 40a and the cover 50a overlap with each other inside and outside the cowl assembly 114a. The side bottom cowl 80a and the rear panel 60a include an overlapping area OSR where the side bottom cowl 80a and the rear panel 60a overlap with each other inside and outside the cowl assembly 114a.

Figure 12:
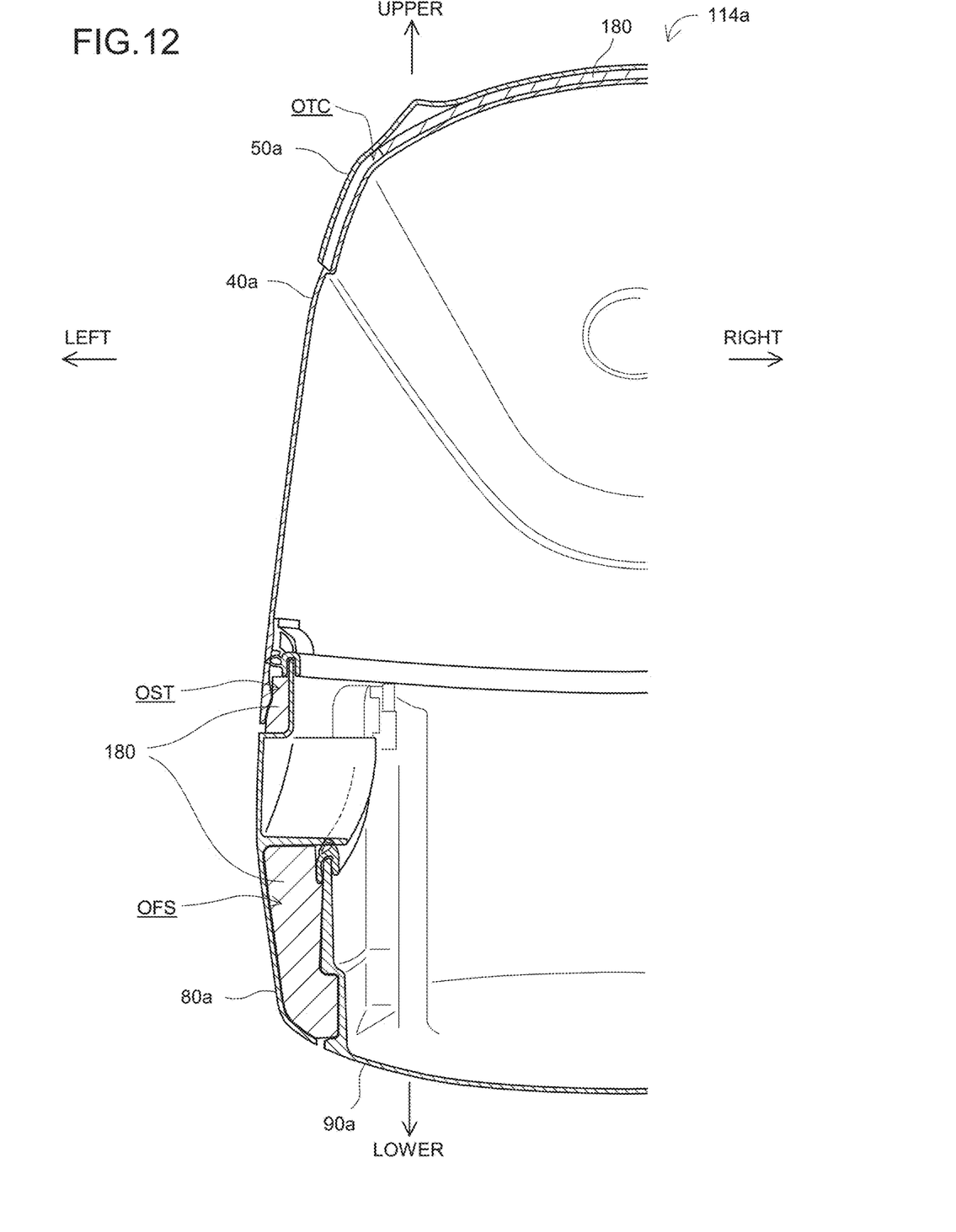
FIG. 12 is an explanatory diagram illustrating a cross-sectional configuration of a cowl assembly along XII-XII in FIG. 10.

FIG. 12 is an explanatory diagram illustrating a cross-sectional configuration of the cowl assembly 114a at a location along XII-XII in FIG. 10. The side bottom cowl 80a and the top cowl 40a include an overlapping area OST where the side bottom cowl 80a and the top cowl 40a overlap with each other inside and outside the cowl assembly 114a. The front bottom cowl 90a and the side bottom cowl 80a include an overlapping area OFS where the front bottom cowl 90a and the side bottom cowl 80a overlap with each other inside and outside the cowl assembly 114a.

In the outboard motor 100a according to the second preferred embodiment, as illustrated in FIG. 11, the soundproof material 180 is provided in the overlapping area OTC where the top cowl 40a overlaps with the cover 50a, and the overlapping area OSR where the side bottom cowl 80a overlaps with the rear panel 60a. Furthermore, as illustrated in FIG. 12, the soundproof material 180 is provided in the overlapping area OST where the side bottom cowl 80*a* overlaps with the top cowl 40*a*, and the overlapping area OFS where the front bottom cowl 90*a* overlaps with the side bottom cowl 80*a*.

The present invention is not limited to the preferred embodiments described above and may be modified in various forms without departing from the spirit thereof and, for example, may be modified as described below.

The configurations of the vessel 10 and the outboard motor 100 according to the above preferred embodiments are merely examples and may be modified in various ways. For example, according to the above preferred embodiments, although the cowl assembly 114 includes the five cowls (the top cowl 40, the cover 50, the rear panel 60, the side bottom cowl 80, and the front bottom cowl 90), there may be any number of cowls included in the cowl assembly 114.

According to the above preferred embodiments, although a sound absorbing material that absorbs sound waves is used as the soundproof material 180, the type of soundproof material is not limited thereto. For example, a vibration control material that suppresses vibrations of each component of the outboard motor 100 may be used as the soundproof material, or an acoustic insulation material that blocks sound waves may be used as the soundproof material.

According to the above preferred embodiments, although the sheet-shaped soundproof material 180 is used as the soundproof material, the shape of the soundproof material 180 is not limited thereto. For example, a fibrous or fluffy shape may be used.

According to the above preferred embodiments, although the bolts 52 and the nuts 53 are used as the fasteners 54, rivets, for example, may also be used. Components such as a gasket or a grommet may also be interposed between the cowl and the fastener 54.

According to the above preferred embodiments, although the cover 50 is provided with the protrusion 56, at least one of the cover 50 and the top cowl 40 may be provided with the protrusion 56.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
  an engine assembly including an engine main body and an intake port to take outside air into the engine main body;
  a top cowl assembly including a top cowl to house at least a portion of the engine assembly and a cover secured to the top cowl to cover at least a portion of an outside of the top cowl; and
  a soundproof material provided between the top cowl and the cover at a location opposed to the intake port in the top cowl assembly.

2. The outboard motor according to claim 1, wherein the soundproof material is between the top cowl and the cover.

3. An outboard motor comprising:
  an engine assembly including an engine main body and an intake port to take outside air into the engine main body;
  a top cowl assembly including a top cowl to house at least a portion of the engine assembly and a cover to cover at least a portion of an outside of the top cowl; and
  a soundproof material provided between the top cowl and the cover at a location opposed to the intake port in the top cowl assembly; wherein
  the soundproof material is between the top cowl and the cover;
  at least one of the top cowl or the cover includes at least one protrusion; and
  the soundproof material is fastened by the at least one protrusion to the at least one of the top cowl or the cover.

4. The outboard motor according to claim 3, wherein
  the soundproof material is substantially sheet-shaped and includes at least one hole therein; and
  the soundproof material is fastened by engagement between the protrusion and the at least one hole.

5. The outboard motor according to claim 4, further comprising a fastener to secure the top cowl and the cover to each other.

6. The outboard motor according to claim 1, wherein
  the intake port includes an upward exposed portion in the engine assembly; and
  the soundproof material is provided between the top cowl and the cover at a location immediately above the intake port in the top cowl assembly.

7. The outboard motor according to claim 1, wherein
  the intake port includes a forward exposed portion in the engine assembly; and
  the soundproof material is provided between the top cowl and the cover at a location immediately in front of the intake port in the top cowl assembly.

8. The outboard motor according to claim 1, wherein
  the top cowl assembly includes a cowl intake port, adjacent to and between the top cowl and the cover, to take outside air into inside of the top cowl assembly; and
  the soundproof material is provided at a location that does not block the cowl intake port.

9. The outboard motor according to claim 1, wherein
  the top cowl includes a heat exhaust port to discharge heat in the top cowl assembly; and
  the soundproof material is provided at a location that does not block the heat exhaust port.

10. The outboard motor according to claim 1, wherein the soundproof material is a sound absorbing material made of a porous material.

11. A vessel comprising:
  a hull; and
  the outboard motor according to claim 1 attached to a rear portion of the hull.

12. An outboard motor comprising:
  an engine assembly;
  a cowl assembly including a plurality of cowls to house at least a portion of the engine assembly, the plurality of cowls including at least one overlapping area where the plurality of cowls overlap with each other inside and outside the cowl assembly; and
  a soundproof material provided in the at least one overlapping area.

13. The outboard motor according to claim 12, wherein the soundproof material is between two of the plurality of cowls in the overlapping area.

14. An outboard motor comprising:
  an engine assembly;
  a cowl assembly including a plurality of cowls to house at least a portion of the engine assembly, the plurality of cowls including at least one overlapping area where the plurality of cowls overlap with each other inside and outside the cowl assembly; and a soundproof material provided in the at least one overlapping area; wherein the soundproof material is between two of the plurality of cowls in the overlapping area;

in the overlapping area, at least one of the two of the plurality of cowls includes at least one protrusion; and the soundproof material is fastened by the protrusion to at least one of the two of the plurality of cowls.

15. The outboard motor according to claim 14, wherein the soundproof material is substantially sheet-shaped and includes at least one hole therein; and the soundproof material is fastened by engagement between the protrusion and the at least one hole.

16. The outboard motor according to claim 15, further comprising a fastener to secure the plurality of cowls to each other.

17. The outboard motor according to claim 12, wherein the cowl assembly includes a cowl intake port to take outside air into inside of the cowl assembly; and the soundproof material is provided at a location that does not block the cowl intake port.

18. The outboard motor according to claim 12, wherein at least one of the plurality of cowls includes a heat exhaust port to discharge heat from the cowl assembly; and the soundproof material is provided at a location that does not block the heat exhaust port.

19. The outboard motor according to claim 12, wherein the soundproof material is a sound absorbing material made of a porous material.

20. A vessel comprising:

a hull; and the outboard motor according to claim 12 attached to a rear portion of the hull.

* * * * *